(12) United States Patent       (10) Patent No.:     US 7,734,150 B2
Irie                            (45) Date of Patent:     Jun. 8, 2010

(54) INFORMATION RECORDING DEVICE HAVING DUBBING FUNCTION

(75) Inventor: Toshiaki Irie, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1177 days.

(21) Appl. No.: 11/334,913

(22) Filed: Jan. 19, 2006

(65) Prior Publication Data

US 2006/0158762 A1    Jul. 20, 2006

(30) Foreign Application Priority Data

Jan. 19, 2005    (JP)    ............... 2005-011594

(51) Int. Cl.
*H04N 7/00*    (2006.01)
(52) U.S. Cl. .................. 386/95; 386/124; 360/15; 725/109
(58) Field of Classification Search ............ 386/95, 386/124; 360/15; 725/109
See application file for complete search history.

(56) References Cited

U.S. PATENT DOCUMENTS 5,715,475 A * 2/1998 Munson et al. ............ 710/10
6,611,537 B1   8/2003 Edens et al.

FOREIGN PATENT DOCUMENTS

| JP | 5-36244 | 2/1993 |
|----|---------|--------|
| JP | 5-89644 | 4/1993 |
| JP | 3070837 | 5/2000 |
| JP | 2004-104287 | 4/2004 |
| JP | 2004-260452 | 9/2004 |

OTHER PUBLICATIONS

Patent Abstracts of Japan, Publication No. 05-036244, Publication Date Feb. 12, 1993, 1 page.
Patent Abstracts of Japan, Publication No. 05-089644, Publication Date Apr. 9, 1993, 1 page.
Patent Abstracts of Japan, Publication No. 2004-104287, Publication Date Apr. 2, 2004, 1 page.
Patent Abstracts of Japan, Publication No. 2004-260452, Publication Date Sep. 16, 2004, 1 page.
English Translation of Japan Utility Model Registration No. U3070837, for Japanese Utility Model Application No. U2000-551, Filing Date Feb. 8, 2000, Date of Registration May 31, 2000, Date of Publication Aug. 15, 2000, 4 pages.
Extended European Search Report for European Application No. 06001065, Mailed on Jun. 7, 2006 (8 pages).

* cited by examiner

*Primary Examiner*—Thai Tran
*Assistant Examiner*—Girumsew Wendmagegn
(74) *Attorney, Agent, or Firm*—Osha • Liang LLP

(57) ABSTRACT

An information recording device according to the present invention includes an HDD 5, a DVD 6 and a VCR 7. During transferring and recording information from DVD 6 onto VCR 7, a transfer control circuit 20 short-circuits between an input node and an output node. Accordingly, an image signal line L1 or L2 is electrically connected to an image signal line L3 through a switch SW and transfer control circuit 20. Namely, information is transmitted to the VCR without providing a direct information transmission path from DVD 6 to VCR 7. The configuration according to the present invention enables bidirectionally transferring information among HDD 5, DVD 6 and VCR 7 with a single switch, thereby enabling dubbing with a simple configuration.

4 Claims, 2 Drawing Sheets

TO TRANSFER CONTROL CIRCUITS 21, 22    FROM SWITCH SW

INFORMATION RECORDING DEVICE HAVING DUBBING FUNCTION

BACKGROUND OF THE INVENTION

1. Field of the Invention

The present invention relates to a dubbing function of an information recording device incorporating, for example, an HDD (Hard Disc Drive), a DVD (Digital Versatile Disc), a VCR (Videocassette Recorder) and the like.

2. Description of the Background Art

In recent years, there have been developed various types of recording media and recording devices for recording information and sound onto such recording media, and these recording media and devices have been used in manners suitable for their applications. However, these recording media have respective recording techniques, which make it difficult to provide compatibility thereamong. This requires utilization of recording devices suitable for respective recording media, thus causing the problem of necessity of complex operations.

Therefore, an information recording device having a dubbing function has become a mainstream, wherein the dubbing function is the function of recording information recorded on VCRs and the like, which have been conventionally commonly domestically utilized, onto other recording media such as a hard disc and a DVD medium to catalog information. For example, there is a DVD recording device incorporating an HDD.

Conventionally, there have been suggested various types of dubbing functions, namely techniques for transferring information from recording media which store information recorded thereon to other recording media. Japanese Patent Laying-Open No. 05-089644 discloses a technique for efficiently conducting editing operations using a hard disc or the like, for dubbing information recorded on a video tape being reproduced onto another video tape. Further, Japanese Patent Laying-Open No. 2004-104287, Japanese Patent Laying-Open No. 2004-260452 and Japanese Utility Model Registration No. 3070837 disclose techniques for temporally recording information into a hard disc and then recording it from the hard disc onto another recording medium, for dubbing. Further, Japanese Patent Laying-Open No. 05-036244 discloses a technique for recording information onto a magneto-optical recording medium such as a DVD medium and then transferring and recording it from the magneto-optical recording medium into a hard disc for dubbing, which enables easily and efficiently performing editing operations and the like using information recorded in the hard disc or the like, since information is temporally recorded in the hard disc or the like and then is transferred and recorded into another recording medium.

On the other hand, in the case of dubbing for simply transferring and recording information from a recording medium onto another recording medium without performing editing operations, it is more efficient to directly perform dubbing without temporally recording the information into a hard disc or the like, which can reduce the dubbing time.

FIG. 3 is a view illustrating the flow of information during dubbing in a conventional information recording device 10.

Referring to FIG. 3, a single information recording device 10 incorporates an HDD recorder (hereinafter, simply referred to as an HDD) 11, a DVD recorder (hereinafter, simply referred to as a DVD) 12 and a videocassette recorder (hereinafter, referred to as a VCR) 13. HDD 11, DVD 12 and VCR 13 are configured to enable dubbing bidirectionally and, therefore, information recording device 10 is also referred to as a triple recorder.

There are illustrated in FIG. 3 information transmission lines L1, L2 and L3, wherein information transmission line L1 is an information transmission line from DVD 12 to the other two recorders HDD 11 and VCR 13. Accordingly, an output node for outputting information from DVD 12 is connected to input nodes of HDD 11 and VCR 13. Information transmission line L2 is an information transmission line from VCR 13 to the other two recorders HDD 11 and DVD 12. Accordingly, an output node for outputting information from VCR 13 is connected to input nodes of HDD 11 and DVD 12. Information transmission line L3 is an information transmission line from HDD 11 to the other two recorders DVD 12 and VCR 13. Accordingly, an output node for outputting information from HDD 11 is connected to input nodes of DVD 12 and VCR 13.

Switches SW1 to SW3 are provided in correspondence with HDD 11, DVD 12 and VCR 13, and control signals CT1 to CT3 are input to the respective corresponding switches for switching among the information transmitting paths.

More specifically, in HDD 11, switch SW1 electrically connects one of information transmission lines L1 and L2 to the input node of HDD 11, in accordance with control signals CT1. In DVD 12, switch SW2 electrically connects one of information transmission lines L2 and L3 to the input node of DVD 12, in accordance with control signals CT2. Similarly, in VCR 13, switch SW3 electrically connects one of information transmission lines L1 and L3 to the input node of VCR 13, in accordance with control signals CT3.

With this configuration, by selectively providing control signals CT1 to CT3 during dubbing, it is possible to easily perform dubbing bidirectionally in HDD 11, DVD 12 and VCR 13.

However, information recording device 10 is configured such that switches SW1 to SW3 are provided in correspondence with the respective recording units: HDD 11, DVD 12 and VCR 13. Also, it is necessary that control signals CT1 to CT3 to be provided to switches SW1 to SW3 are selectively transmitted from the control circuits (not shown) of the respective recording units, and the respective recording units can be individually operated, which causes the problem of complexity of controls.

SUMMARY OF THE INVENTION

The present invention has been made in order to solve the aforementioned problems and aims to provide an information recording device which enables easily performing control thereof for bidirectional dubbing, while having a simple configuration.

An information recording device according to the present invention includes a first recording unit capable of recording information onto a first recording medium, a second recording unit capable of recording information onto a second recording medium, and a third recording unit capable of recording information onto a third recording medium. Each recording unit includes a transfer control circuit for controlling the transfer of information from and to the other recording units, and an information recording circuit for recording information transmitted thereto during transferring. The information recording device further includes a first transfer line which connects an output node of the transfer control circuit of the first recording unit to input nodes of the transfer control circuits of the second and third recording units to transfer information therebetween, a second transfer line which transfers information from an output node of the transfer control circuit of the second recording unit to an input node of the transfer control circuit of the first recording unit, and a third transfer line which transfers information from an output node of the transfer control circuit of the third recording unit to the input node of the transfer control circuit of the first recording unit. The first recording unit includes a switch which switches the connection of the input node to the second and third transfer lines in response to an instruction. The transfer control circuit of the first recording unit includes a short-circuit control circuit which short-circuits between the input node and the output node during transferring from one of the second recording unit and the third recording unit to the other one of them. The switch electrically connects the second transfer line to the input node during transferring from the second recording unit to the third recording unit and electrically connects the third transfer line to the input node during transferring from the third recording unit to the second recording unit. The first recording unit corresponds to a hard disc recorder, the second recording unit corresponds to a DVD recorder, and the third recording unit corresponds to a video cassette recorder.

An information recording device according to the present invention includes a first recording unit capable of recording information onto a first recording medium, a second recording unit capable of recording information onto a second recording medium, and a third recording unit capable of recording information onto a third recording medium. Each recording unit includes a transfer control circuit for controlling the transfer of information from and to the other recording units, and an information recording circuit for recording information transmitted thereto during transferring. The information recording device further includes a first transfer line which connects an output node of the transfer control circuit of the first recording unit to input nodes of the transfer control circuits of the second and third recording units to transfer information therebetween, a second transfer line which transfers information from an output node of the transfer control circuit of the second recording unit to an input node of the transfer control circuit of the first recording unit, and a third transfer line which transfers information from an output node of the transfer control circuit of the third recording unit to the input node of the transfer control circuit of the first recording unit. The first recording unit includes a switch which switches the connection of the input node to the second and third transfer lines in response to an instruction. The transfer control circuit of the first recording unit includes a short-circuit control circuit which short-circuits between the input node and the output node during transferring from one of the second recording unit and the third recording unit to the other one of them.

Preferably, the switch electrically connects the second transfer line to the input node during transferring from the second recording unit to the third recording unit and electrically connects the third transfer line to the input node during transferring from the third recording unit to the second recording unit.

Preferably, the first recording unit corresponds to a hard disc recorder, the second recording unit corresponds to a DVD recorder, and the third recording unit corresponds to a video cassette recorder.

The information recording device according to the present invention includes, in the transfer control circuit of the first recording unit, a short-circuit control circuit which short-circuits between the input node and the output node during transferring from one of the second recording unit and the third recording unit to the other one of them. Accordingly, during transferring from one of the second recording unit and the third recording unit to the other one of them, the first transfer line is electrically connected through the switch to one of the second and third transfer lines through the short-circuit control circuit, thereby transmitting information to the other one of the recording units. Namely, with a single switch, it is possible to bidirectionally transfer information among the first to third recording units, and to realize a dubbing operation with a simple configuration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
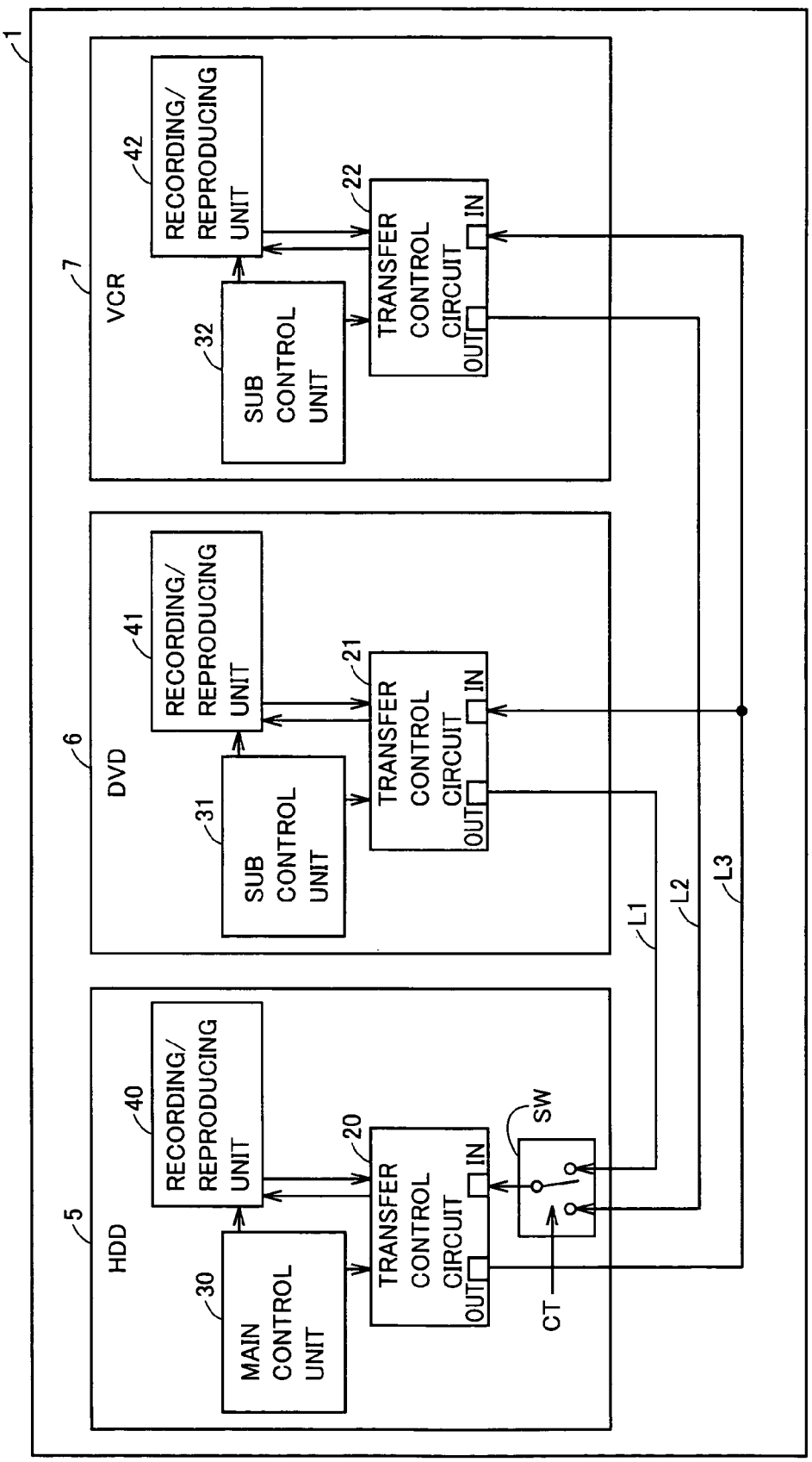
FIG. 1 is a schematic block diagram of an information recording device according to an embodiment of the present invention.

Hereinafter, embodiments of the present invention will be described with reference to the drawings. Herein, like reference characters designate the same and corresponding portions and description thereof will not be repeated.

Referring to FIG. 1, an information recording device 1 according to an example of the present invention includes an HDD 5, a DVD 6 and a VCR 7. Further, information recording device 1 further includes an information transmission line L1 for transmitting information from DVD 6 to HDD 5, an information transmission line L2 for transmitting information from VCR 7 to HDD 5, and an information transmission line L3 for transmitting information from HDD 5 to DVD 6 and VCR 7. Further, HDD 5 includes a main control unit 30 for controlling the entire HDD, a recording/reproducing unit 40 for recording information onto a recording medium or reproducing information recorded on a recording medium, a transfer control circuit 20 for transmitting/receiving information to/from other recording units during dubbing to control transmission/reception of information for performing dubbing, and a switch SW for selecting one of information transmission lines L1 and L2 in accordance with control signals CT to electrically connect it to an input node of transfer control circuit 20. An output node of the transfer control circuit 20 is electrically connected to information transmission line L3, which enables transmitting information to the input nodes of transfer control circuits 20, 21.

Main control unit 30 has substantially the same functions as those of sub control units 31, 32. However, main control unit 30 also controls sub control units 31, 32 and, therefore, there is a so-called subordinate-superior relationship therebetween.

DVD 6 includes a sub control unit 31 for controlling the entire DVD 6, a recording/reproducing unit 41 for recording information onto a recording medium or reproducing information recorded on a recording medium, and a transfer control circuit 21 for transmitting/receiving information to/from other recording units during dubbing to control transmission/reception of information for performing dubbing. An input node of transfer control circuit 21 is electrically connected to information transmission line L3 and the output node thereof is electrically connected to information transmission line L1.

VCR 7 includes a sub control unit 32 for controlling the entire VCR 7, a recording/reproducing unit 42 for recording information onto a recording medium or reproducing information recorded on a recording medium, and a transfer control circuit 22 for transmitting/receiving information to/from other recording units during dubbing to control transmission/reception of information for performing dubbing. An input node of transfer control circuit 22 is electrically connected to information transmission line L3 and the output node thereof is electrically connected to information transmission line L2.

Figure 2:
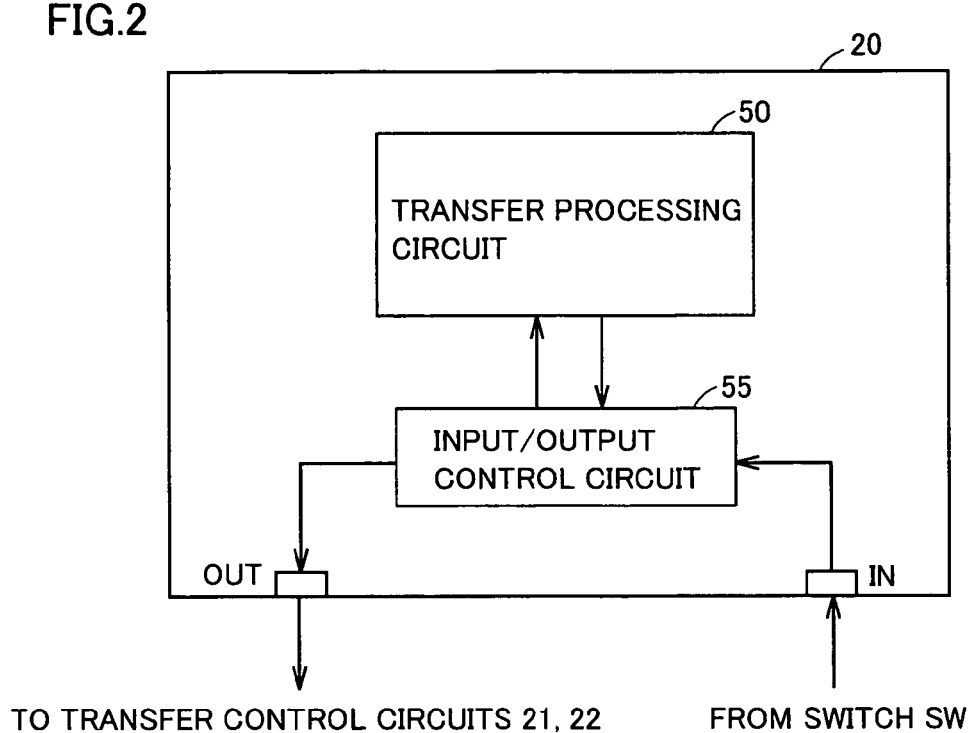
FIG. 2 is a view schematically illustrating a portion of a transfer control circuit of an HDD.
Figure 3:
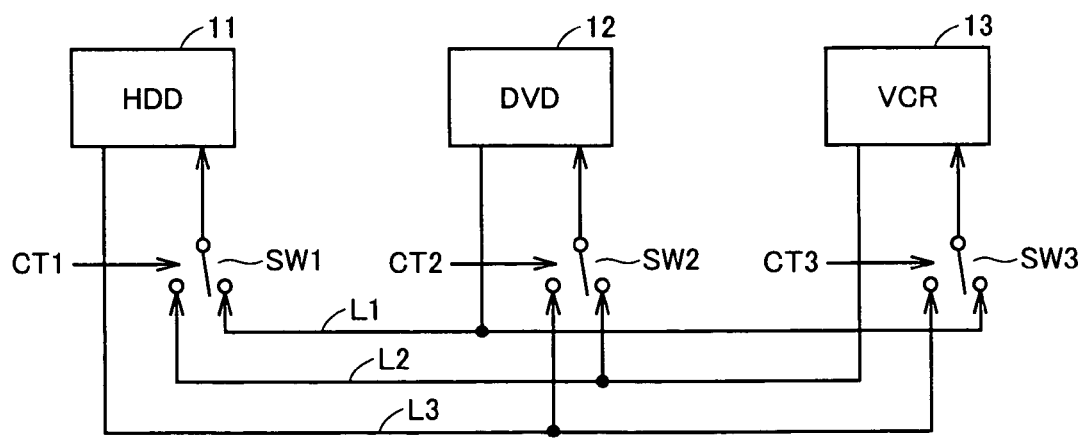
FIG. 3 is a view illustrating the flow of information during dubbing in a conventional information recording device.

Referring to FIG. 2, HDD 5 includes, as a portion of the transfer control circuit thereof, an input/output control circuit 55 for controlling the transfer of information input to the input node and information output to the output node, and a transfer processing circuit 50 for executing processes for transferring information to/from input/output control circuit 55 during dubbing.

Hereinafter, there will be described processes executed in information recording device 1 according to the embodiment of the present invention, during dubbing.

In the case of dubbing from HDD 5 to DVD 6 or VCR 7, main control unit 30 controls recording/reproducing unit 40 and transfer control circuit 20. Recording/reproducing unit 40 transfers, to transfer control circuit 20, information recorded in an internal memory or the like (not shown), in response to commands from main control unit 30. Transfer control circuit 20 transfers the information transmitted thereto from recording/reproducing unit 40 to information transmission line L3 from the output node through transfer control circuit 50 and input/output control circuit 55. Accordingly, the information transmitted to information transmission line L3 is input to transfer control circuit 21 or 22 of DVD 6 or VCR 7. Then, the recording/reproducing units in the respective recording units execute operations for recording the information onto a corresponding recording medium.

For example, in DVD 6, sub control unit 31 controls transfer control circuit 21 and recording/reproducing unit 41 to execute transferring and recording. More specifically, transfer control circuit 21 performs a process for converting information transmitted thereto through information transmission line L3 into a form which can be recorded with recording/reproducing unit 41 and other processes, and outputs it to recording/reproducing unit 41. On the basis of commands from sub control unit 31, recording/reproducing unit 41 records the transmitted information onto a DVD medium which is a magneto-optical disc, wherein the DVD medium has been housed therein in advance and can be ejected therefrom. The operations for recording/reproducing information onto/from a magneto-optical disc which are executed in recording/reproducing unit 41 are common techniques and, therefore, description thereof is not given herein.

Similarly, VCR 7 executes the same processes. More specifically, sub control unit 32 controls transfer control circuit 22 and recording/reproducing unit 42 to execute transferring and recording. Transfer control circuit 22 performs a process for converting information transmitted thereto through information transmission line L3 into a form which can be recorded with recording/reproducing unit 42 and other processes, and then outputs it to recording/reproducing unit 42. On the basis of commands from sub control unit 32, recording/reproducing unit 42 records the transmitted information onto a VCR medium which is a video tape, wherein the VCR medium has been housed therein in advance and can be ejected. The operations for recording/reproducing information onto/from a video tape which are executed in recording/reproducing unit 42 are common techniques and, therefore, description thereof is not given herein. Since data recorded on a video tape is analog signals, transfer control circuit 22 includes a so-called D/A conversion circuit, not shown, for converting information input from the input node, namely digital signals, into analog signals. On the other hand, HDD 5 and DVD 6 process digital signals, not analog signals, and therefore transfer control circuit 22 includes a so-called A/D conversion circuit for converting analog signals reproduced by recording/reproducing unit 42 into digital signals to output the digital signals from the output node.

In the case of dubbing from DVD 6 or VCR 5 to HDD 5, sub control unit 31 or 32 in VCR 7 or HDD 5 controls recording/reproducing unit 41 or 42 and transfer control circuit 21 or 22. For example, recording/reproducing unit 41 transmits information recorded on a DVD medium which has been housed therein in advance to transfer control circuit 21, in response to commands from sub control unit 31. Transfer control circuit 21 transmits the information transmitted thereto from recording/reproducing unit 41 from the output node thereof to information transmission line L1. Accordingly, the information transmitted to information transmission line L1 is input to switch SW of HDD 5.

Also, recording/reproducing unit 42 transmits information recorded on a video tape which has been housed therein in advance to transfer control circuit 22, in response to commands from sub control unit 32. Transfer control circuit 22 transmits the information transmitted thereto from recording/reproducing unit 42 from the output node thereof to information transmission line L2. Accordingly, the information transmitted to information transmission line L2 is input to switch SW of HDD 5.

Then, switch SW electrically connects one of information transmission lines L1 and L2 to the input node IN, in response to control signals CT. Then, recording/reproducing unit 40 in HDD 5 executes an operation for recording onto a corresponding recording medium.

For example, in HDD 5, main control unit 30 controls transfer control circuit 20 and recording/reproducing unit 40 to execute transferring and recording. More specifically, transfer processing circuit 50 in transfer control circuit 20 performs a process for converting information transmitted thereto through information transmission line L1 or L2 and input/output control circuit 55 into a form which can be recorded with recording/reproducing unit 40 and other processes, and outputs it to recording/reproducing unit 40. On the basis of commands from main control unit 30, recording/reproducing unit 40 records the transmitted information onto a memory or the liken incorporated therein. The operations for recording/reproducing information onto/from the memory or the like which are executed in recording/reproducing unit 40 are common techniques and, therefore, description thereof is not given herein.

In the case of dubbing from DVD 6 to VCR 7 or VCR 7 to DVD 6, sub control unit 31 or 32 in VCR 7 or HDD 5 controls recording/reproducing unit 41 or 42 and transfer control circuit 21 or 22.

Dubbing from DVD 6 to VCR 7 will be described as an example. For example, recording/reproducing unit 41 transmits information recorded on a DVD medium which has been housed therein in advance to transfer control circuit 21, in response to commands from sub control unit 31. Transfer control circuit 21 transmits the information transmitted thereto from recording/reproducing unit 41 from the output node thereof to information transmission line L1. Accordingly, the information transmitted to information transmission line L1 is input to switch SW of HDD 5.

Then, switch SW electrically connects one of information transmission lines L1 and L2 to input node IN, in response to control signals CT. In this case, switch SW electrically connects information transmission line L1 to input node IN, in response to control signals CT. Consequently, the information from DVD 6 is input to input/output control circuit 55. Input/output control circuit 55 operates to form a short-circuit path such that information input to input node IN is output from an output node OUT, in response to commands from main control unit 30, during dubbing from DVD 6 to VCR 7 or during dubbing from VCR 7 to DVD 6. Accordingly, information input to input node IN is output, again, from output node OUT through input/output control circuit 55. At this time, operations for transferring information between transfer processing circuit 50 and input/output control circuit 55 are not executed.

With the operation of input/output control circuit 55 during dubbing from DVD 6 to VCR 7 or during dubbing from VCR 7 to DVD 6, information transmission line L1 and information transmission line L3 are electrically connected to each other through transfer control circuit 20. Accordingly, information is input to input node IN of transfer control circuit 22 in VCR 7 through information transmission line L3 and, the information is transferred and recorded onto the tape recorder in VCR 7, on the basis of the aforementioned process. Namely, even though there is no direct information transmission path from DVD 6 to VCR 7 or from VCR 7 to DVD 6, information can be transmitted therebetween by using information transmission line L1.

In the case of dubbing from VCR 7 to DVD 6, the same process as aforementioned process is executed and, only the switching of switch SW is different therefrom. Therefore, detailed description thereof is not repeated herein.

Namely, information recording device 1 according to the embodiment of the present invention is provided with only a single switch SW which is switched in response to control signals CT during dubbing and, therefore, it is not necessary to provide switchable switches in correspondence with the respective recording units, thereby enabling dubbing with a simple configuration.

Further, the control of switch SW is performed by main control unit 30 and this control is performed without using other sub control units 31, 32, which reduces the overall controlling load on information recording device 1. Further, it is possible to eliminate information transmission lines for transmitting information between DVD 6 and VCR 7, thereby reducing the cost.

While a triple recorder incorporating an HDD, a DVD and a VCR within a single device has been described in this embodiment, the present invention is not limited thereto and may be similarly applied to devices which incorporate a recording unit according to a different recording technique or are connected through an external terminal to such a recording unit. For example, it is possible to realize dubbing to or from a video recorder through a DV terminal. Also, while in this embodiment, there has been described a triple recorder incorporating different three recording units within a single device, at least two recording units having the same functions may be incorporated in a single device or an arbitrary combination of recording units may be incorporated in a single device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recording device comprising:
a first recording unit capable of recording information onto a first recording medium;
a second recording unit capable of recording information onto a second recording medium;
a third recording unit capable of recording information onto a third recording medium, wherein each of the recording units comprises:
    a transfer control circuit for controlling a transfer of information from and to the other recording units; and
    an information recording circuit for recording information transmitted thereto during transferring;
a first transfer line connecting an output node of the transfer control circuit of said first recording unit to input nodes of the transfer control circuits of said second and third recording units to transfer information therebetween;
a second transfer line connecting an output node of the transfer control circuit of said second recording unit to an input node of the transfer control circuit of said first recording unit to transfer information therebetween; and
a third transfer line connecting an output node of the transfer control circuit of said third recording unit to the input node of the transfer control circuit of said first recording unit to transfer information therebetween,
wherein said first recording unit comprises a switch to switch the connection of the input node of the transfer control circuit of said first recording unit to the second and third transfer lines in response to an instruction,
wherein the transfer control circuit of said first recording unit comprises a short-circuit control circuit to short-circuit between the input node and the output node during transferring from one of said second recording unit and said third recording unit to the other one of them,
wherein said switch electrically connects said second transfer line to said input node during transferring from said second recording unit to said third recording unit and electrically connects said third transfer line to said input node during transferring from said third recording unit to said second recording unit, and
wherein said first recording unit corresponds to a hard disc recorder, said second recording unit corresponds to a DVD recorder, and said third recording unit corresponds to a video cassette recorder.

2. An information recording device comprising:
a first recording unit capable of recording information onto a first recording medium;
a second recording unit capable of recording information onto a second recording medium;
a third recording unit capable of recording information onto a third recording medium, wherein each of the recording units comprises:
    a transfer control circuit for controlling the transfer of information from and to the other recording units; and
    an information recording circuit for recording information transmitted thereto during transferring;
a first transfer line connecting an output node of the transfer control circuit of said first recording unit to input nodes of the transfer control circuits of said second and third recording units to transfer information therebetween;
a second transfer line connecting an output node of the transfer control circuit of said second recording unit to an input node of the transfer control circuit of said first recording unit to transfer information therebetween; and
a third transfer line connecting an output node of the transfer control circuit of said third recording unit to the input node of the transfer control circuit of said first recording unit to transfer information therebetween, wherein said first recording unit comprises a switch to switch the connection of the input node of the transfer control circuit of said first recording unit to the second and third transfer lines in response to an instruction, and wherein the transfer control circuit of said first recording unit comprises a short-circuit control circuit to short-circuit between the input node and the output node during transferring from one of said second recording unit and said third recording unit to the other one of them.

3. The information recording device according to claim 2, wherein said switch electrically connects said second transfer line to said input node during transferring from said second recording unit to said third recording unit and electrically connects said third transfer line to said input node during transferring from said third recording unit to said second recording unit.

4. The information recording device according to claim 2, wherein said first recording unit corresponds to a hard disc recorder, said second recording unit corresponds to a DVD recorder, and said third recording unit corresponds to a video cassette recorder.

* * * * *